United States Patent
Miyamoto et al.

(10) Patent No.: US 6,476,524 B1
(45) Date of Patent: Nov. 5, 2002

(54) LINEAR MOTOR

(75) Inventors: Yasuhiro Miyamoto; Kazuhiro Maekawa; Takato Doi; Masaki Hisatsune, all of Fukuoka (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/601,900

(22) PCT Filed: Feb. 12, 1999

(86) PCT No.: PCT/JP99/00627

§ 371 (c)(1),
(2), (4) Date: Sep. 21, 2000

(87) PCT Pub. No.: WO99/41825

PCT Pub. Date: Aug. 19, 1999

(30) Foreign Application Priority Data

Feb. 13, 1998 (JP) .............................................. 10-48719
Dec. 22, 1998 (JP) ........................................... 10-365174

(51) Int. Cl.$^7$ .............................................. H02K 41/03
(52) U.S. Cl. ...................... 310/12; 310/180; 310/184; 310/68 C
(58) Field of Search ........................... 310/12, 13, 179, 310/154, 180, 184, 68 C

(56) References Cited

U.S. PATENT DOCUMENTS

| 4,504,750 A | * | 3/1985 | Onodera et al. ............... 310/12 |
| 5,910,691 A | * | 6/1999 | Wavre .......................... 310/12 |
| 6,025,659 A | * | 2/2000 | Nashiki ........................ 310/12 |

FOREIGN PATENT DOCUMENTS

| JP | 49-113108 | | 9/1974 | |
| JP | 55-33823 | | 8/1980 | |
| JP | 59-95789 | * | 6/1984 | ......... H02K/41/035 |
| JP | 61-153489 | | 9/1986 | |
| JP | 3-285555 | | 12/1991 | |
| JP | 3-288555 | * | 12/1991 | .......... H02K/41/03 |
| JP | 4-67763 | * | 3/1992 | ......... H02K/41/035 |
| JP | 5-9181 | | 2/1993 | |
| JP | 6-121503 | * | 4/1994 | .......... H02K/19/10 |
| JP | 6-263366 | * | 9/1994 | .......... H02K/41/03 |
| JP | 8-205514 | * | 8/1996 | .......... H02K/41/03 |

* cited by examiner

Primary Examiner—Burton S. Mullins
(74) Attorney, Agent, or Firm—Jordan and Hamburg LLP

(57) ABSTRACT

A moving-coil linear motor free of cogging. The motor has a rotor (3) including separated block cores (31, 32 and 33), each of which has a length equivalent to eight times the magnet pitch (Pm) and includes nine teeth (4) along the length. The block cores are arranged in line and separated by gaps equivalent to ⅔ of the magnet pitch. The first block (31) is divided into three groups of teeth (4) with armature coils (5) to form U-, V- and W-phases. Similarly, the second block (32) is grouped to form V-, W- and U-phases, and the third block (33) is grouped to form W-, U- and V-phases. The armature coils (5) are formed to differ in phase by 120 degrees from one another in order to zero the sum of the cogging caused by the blocks.

38 Claims, 18 Drawing Sheets

(a)

(b)

(a)

(b)

(a)

(b)

(a)

(b)

(a)

(b)

LINEAR MOTOR

BACKGROUND OF THE INVENTION

The present invention relates to a moving-coil linear motor.

A prior art moving-coil linear motor is, as shown in FIG. 22, provided with a field permanent magnet 11 secured at a fixing portion and a comb teeth-like armature core 12 opposed to the field permanent magnet 11. The comb teeth-like armature core 12 has armature coils 13 divided and wound therein. In the armature core 12 having the wound armature coils 13, where the number of phases is n, the number of field permanent magnets 11 is p, and the number of teeth 14 corresponding to one pole is q, the number N of teeth provided in the armature core 12 is:

$$N = n \times p \times q$$

In the armature coil 12 which has a number of teeth formed equidistantly, three-phase windings U, V, and W of the armature coil 13 are wound with at least two tooth pitches skipped.

Therefore, the moving-coil linear motor is such that the magnetic circuit of a moving armature core 12 is not endless and is open at both ends thereof, whereby slots at both sides in the rotor thrust direction accommodate one coil, differing from the slots at the central portion. And, an edge effect occurs due to the slots, wherein a cogging thrust TC of one cycle is generated in the magnetic pole pitch of field magnets 11, thereby causing unevenness in the thrust.

SUMMARY OF THE INVENTION

Also, where a temperature sensor is inserted into a slot accommodating a coil in order to control the temperature of the coils, it is necessary to make the slot large, whereby the armature core is increased in size, and such a problem occurs, by which the ratio of occupancy of windings is lowered. Therefore, although the temperature sensor is provided at both ends of the coils in the linear motors, the temperature of the central portion of the coil cannot be measured, wherein only inaccurate temperature detection was possible.

DISCLOSURE OF THE INVENTION

The present invention solves such problems resulting from the cogging thrust, and it is therefore an object of the invention to provide a linear motor in which the detection accuracy of the coil temperature can be improved.

Therefore, in the invention, the armature core is divided into a plurality of block cores, and teeth secured at the respective block cores equidistantly from one another are provided with armature coils wound in the form of lumped winding, and the block cores are disposed in the thrust direction where spacing corresponding to an electrical angle greater by an integer number of times than a value which is obtained by dividing the electrical angle 180° of the magnet pitch by the number of divisions is secured between the block cores, wherein the armature coils of the block cores between which the spacing is secured are wound so that their phases shift by the electrical angle corresponding to the spacing.

Therefore, phases of the cogging thrust generated due to the armature coils of the respective block cores are subjected to phase shifts at the electrical angle in response to the spacing one after another, whereby the cogging thrusts generated in the respective block cores can be mutually counterbalanced and are zeroed by each other. Therefore, the winding can be constituted by a complete three-phase balanced winding, and it is possible to insert a temperature sensor in the spacing between the block cores.

The armature core is divided into three block cores, that is, the armature core is provided with the first block core, second block core, and third block core, each of which has nine teeth having a length longer by eight times than the magnet pitch at equal intervals, and is provided with a three-phase armature coil wound in the form of lumped winding with the teeth of the respective block cores divided into three groups, a spacing equivalent to two-thirds the magnet pitch is provided between the respective block cores, and is disposed in the thrust direction, wherein the first block core is divided into three groups to form U, V and W phases in that order, in which an armature coil is wound, the second block core is divided into three groups to form V, W and U phases in the order, in which an armature coil is wound, and the third block core is divided into three groups to form W, U and V phases in that order, in which an armature coil is wound, whereby the respective phase coils are connected in equilibrium to each other.

The three block cores are disposed in the thrust direction with a spacing of one-third the magnet pitch secured between the three block cores, and teeth are divided into three groups, wherein an armature coil may be wound in the respective groups in the order of U, V and W phases in the first block core, an armature coil maybe wound, with the winding direction reversed, in the respective groups in the order of W, U and V phases in the second block core, and an armature coil may be wound, in the same direction as that in the first block core, in the order of V, W and U-phases in the third block core.

Also, the armature core is divided into two block cores, wherein the first block core is provided with nine teeth, longer by eight times than the magnet pitch, at equal intervals, the second block core of the same configuration as that of the first block core is disposed in the thrust direction with a spacing of one half the magnet pitch secured between the block cores, and teeth of the first block core are divided into three groups and an armature coil is wound in the order of U, V, and W phases, wherein in the second block core, the V-phase coil is wound in one tooth, the W-phase coil is wound in the next three teeth as a group, the U phase coil is wound in the further next three teeth as a group, and the V-phase coil is wound in the remaining two teeth.

Further, as a means to bring about similar effects, there is a means in which the second block core is divided into three groups, and an armature coil is wound in the order of V phase and W phase so that the phase of the magnetomotive force vector is electrically shifted by 120° from that of the first block core.

Also, in any case, a spacing piece of a magnetic substance is inserted in the clearance between the block cores to retain the spacing, and a temperature sensor such as a thermister or a thermal protector is inserted into the clearance, and it is possible to control the temperature of the coils.

Thus, according to the invention, in a moving coil linear motor, the armature core of the rotor is divided into a plurality of block cores which will be disposed in the thrust direction, the respective block cores are provided with teeth divided into groups equivalent to the number of phases disposed at equal intervals, and the block cores are disposed in the thrust direction in a state where they are placed in the thrust direction with a spacing greater by an integer number of times by which the magnet pitch is divided by the number of divisions between the block cores. Since the phase of the armature coil of the respective core is caused to shift by an electrical angle corresponding to the abovementioned spacing, the armature coil can be wound in the form of lumped winding on the teeth, and the cogging thrust resulting from the edge effect of the rotor can be counterbalanced to zero the cogging thrust, whereby it is possible to obtain a highly accurate linear motor.

The rotor is divided into three block cores, which are disposed in the thrust direction at a spacing equivalent to two-thirds or one-third of the magnet pitch, the respective block cores are caused to have nine teeth longer by eight times than the magnet pitch, and they are divided into three groups to form a winding, wherein a coil is directly wound on the teeth in the form of lumped winding, and the flux linkage is large. Further, 3-phase balanced connection can be secured.

Also, the rotor may be divided into two block cores, which may be disposed at intervals equivalent to one half of the magnet pitch, and the respective armature coils are caused to differ in phase by 90° from each other, and where the cogging thrusts of the same phase are connected to each other in series, the circulating current resulting from the phase difference in the magnetomotive force can be removed, and it is possible to obtain a highly efficient linear motor. The armature coil of the respective block core is caused to shift by an electrical angle corresponding to the spacing, whereby it is possible to directly wind the armature coil on the teeth in the form of lumped winding, and there is an effect by which the cogging thrust resulting from the edge effects of the rotor can be zeroed by mutually counterbalancing the same in the respective block cores. Therefore, a highly accurate linear motor can be obtained.

The rotor is divided into three block cores which will be disposed in the thrust direction at a spacing equivalent to two-thirds or one-third of the magnet pitch, and nine teeth are provided, with a length longer by eight times than the magnet pitch, which are divided into three groups and are, respectively, provided with winding, whereby, since the winding is wound directly on the teeth to secure a lumped winding, the flux linkage is increased, and three-phase balanced connection can be obtained.

Also, the rotor is divided into two block cores which are disposed at intervals equivalent to one half of the magnet pitch. Where the respective armature coils are connected with the same phase cogging thrusts placed in series in a state where the respective armature coils are placed with a difference of 90° in phase, a circulating current resulting from a difference in the electromotive force is removed, and a highly efficient linear motor can be obtained.

Further, it is possible to detect the temperature of the intermediate coil portions by providing a temperature sensor in the clearance, whereby it is possible to accurately control the temperature of the coils in a linear motor. Also, if the clearance incorporating the temperature sensor is integrated by resin molding, and retaining of the temperature sensor becomes reliable, wherein an advantage can be obtained by which the detection accuracy of the temperature can be improved.

Also, by engaging and connecting the teeth, which constitute the block cores, with engagement projections and fitting portions of an iron relay part, the teeth can be easily punched out, whereby the teeth on which coils are wound can be linked with each other, and it becomes easy to carry out the winding work.

DETAILED DESCRIPTION

A description is given of the embodiments of the invention with reference to the accompanying drawings.

Figure 1:
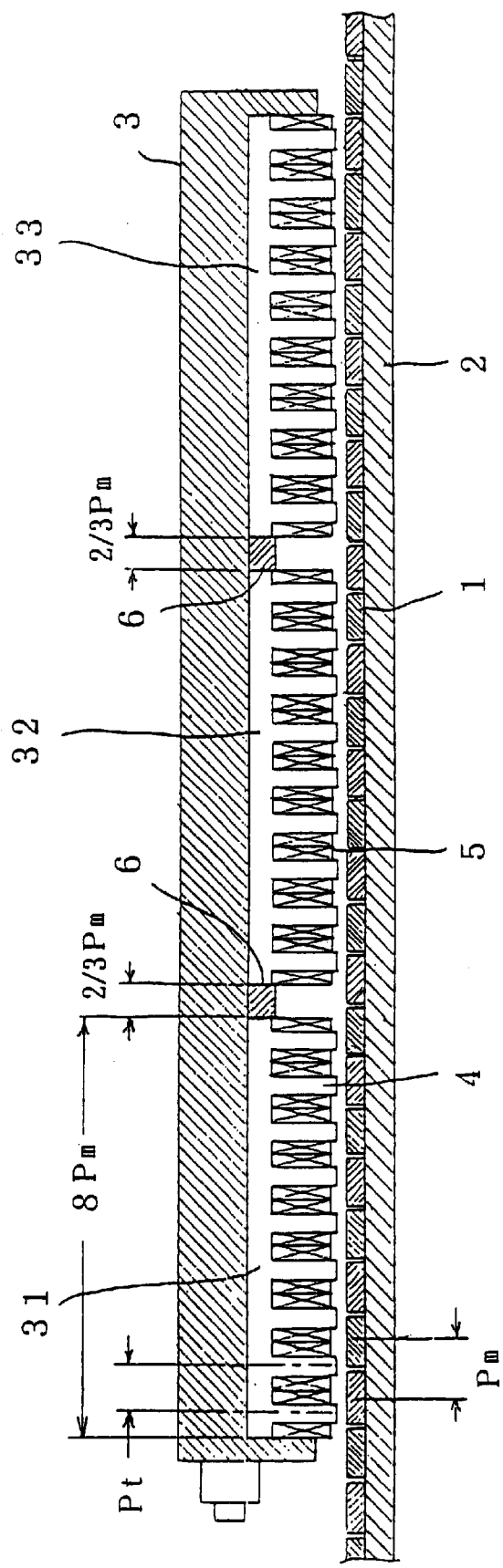
FIG. 1 is a side sectional view showing a first embodiment of the invention.

FIG. 1 shows the first embodiment of the invention. 1 indicates field magnets attached to the fixing portion 2 at equal pitches Pm, and the field magnets 1 are disposed at a length which is obtained by adding the length of the rotor 3 moving with respect to the field magnets 1 to a stroke for which the rotor moves. The cores attached to the rotor 3 is divided into three cores, the first block core 31, second block core 32, and third block core 33, which are provided in the moving direction.

The respective block cores 31, 32, and 33 are provided with a length equivalent to eight times the pitch Pm of the field magnets 1 and are, respectively, provided with nine teeth 4 at equal pitches Pt, wherein the teeth 4 are divided into three groups, and armature coils 5 of the respective phases are directly wound in the form of lumped winding. 6 is a spacer placed between the respective block cores, and has a width equivalent to two thirds of the pitch Pm of the field magnet 1. It is highly recommended that the spacer is made of a non-magnetic body.

A slot pitch in the winding layout of an electromagnetic structure where the number of magnetic poles corresponding to the three-phase nine coils becomes eight therewith becomes 160° in terms of electrical angle. Therefore, since the coil skips as in No. 1 and No. 2, coils are directly wound on the teeth in the form of lumped winding. Accordingly, as shown in the connection diagram in FIG. 2(a), the first block core 31 is provided with coils 5 in the teeth 4 of the respective groups in the order of U phase, V phase and W phase.

The second block core 32 is caused to shift in the thrust direction with respect to the first block core 31 by the spacer 6 by two thirds the magnet pitch Pm, and since the magnet pitch Pm is 180° in terms of electrical angle, the second block core will shift by 120° in terms of electrical angle, wherein since the armature coil of the block core is given a phase shift of 120° with respect to the armature coil of the first block core, the second block core is provided with armature coils 5 in the order of V phase, W phase and U phase from the edge at the same side as in the first block core.

Also, armature coils 5 of the third block core 33 is caused to shift by 120° from the second block core 32 as well, wherein the third block core 33 is wound in the order of W phase, U phase and V phase.

Accordingly, as in a case where no phase shifts, the flux linkage becomes the maximum at the position where the respective phase coils are opposed to the corresponding magnets.

Figure 2:
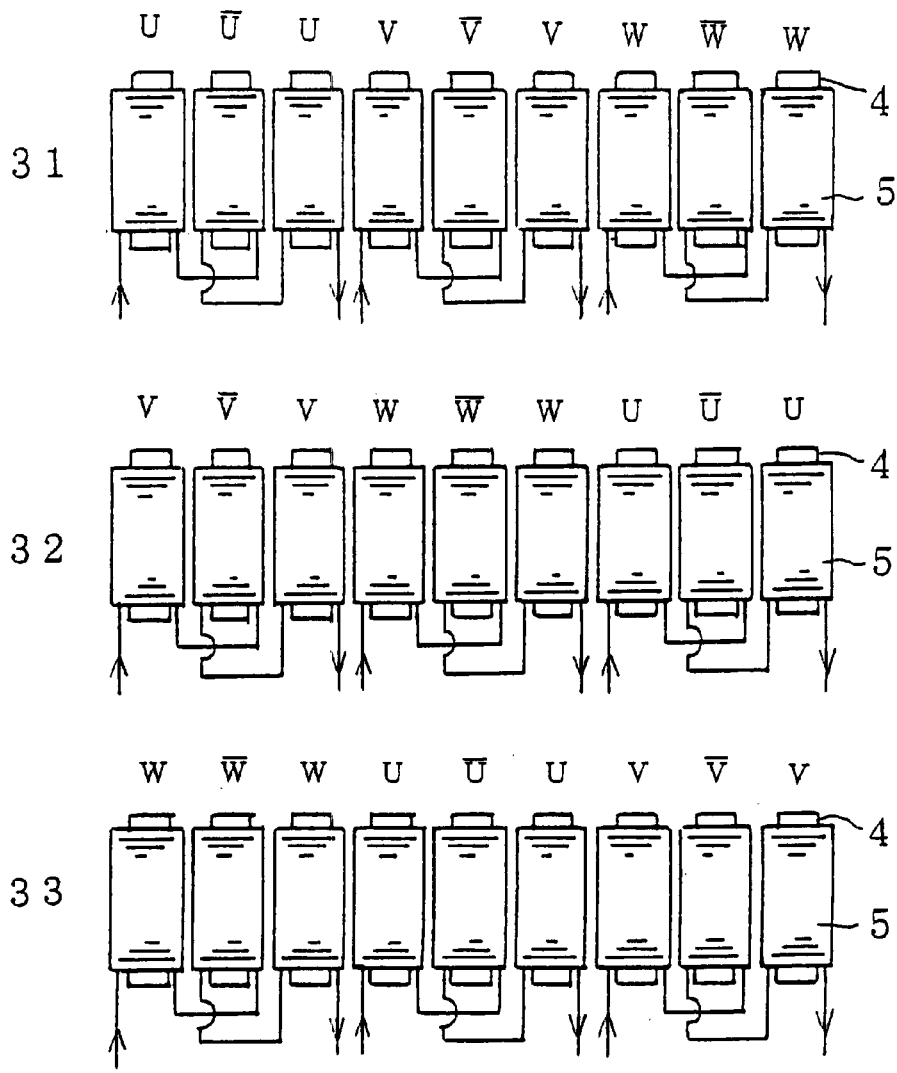
FIG. 2 is an explanatory view of winding in the first embodiment, wherein (a) is a connection diagram, and (b) is a winding layout diagram.
Figure 2:
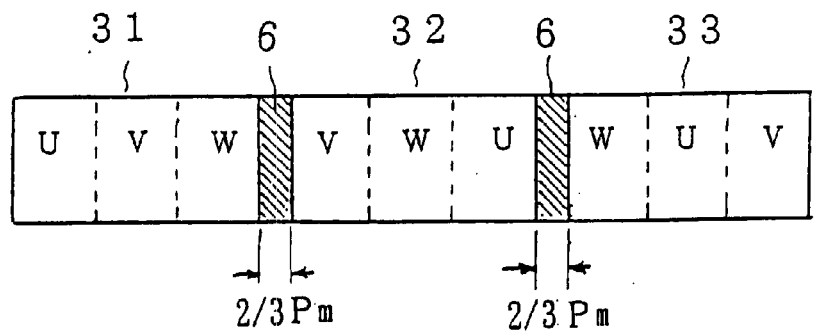
Figure 3:
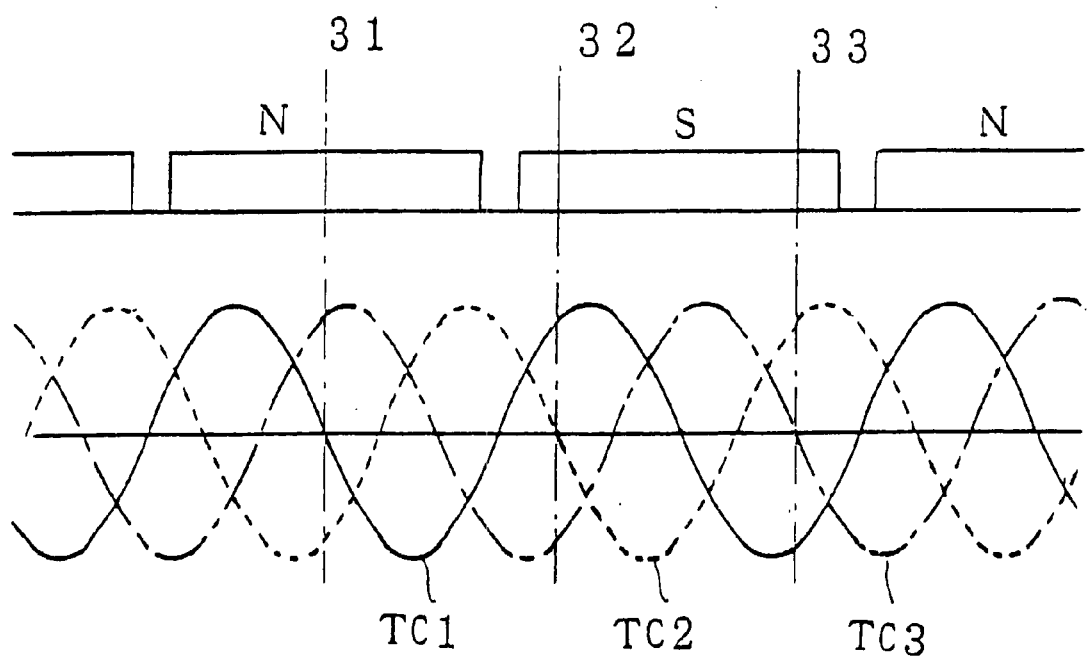
FIG. 3 is a characteristic view showing states of the cogging thrust in the first embodiment.

Thus, the coil layout of the respective block cores of the rotor 3 is as shown in FIG. 2(b), and the block cores 31, 32 and 33 are spaced from each other by spacers 6 having a space equivalent to two-thirds (120° in terms of electrical angle) of the pitch Pm of the field magnet 1. Accordingly, if the armature coils of the respective block cores are wound with a difference in phase, which is 120° in terms of electrical angle, cogging thrusts TC1, TC2 and TC2 generated due to an edge effect of the respective block cores produces, as shown in FIG. 3, a difference in phase which is 120°, thereby zeroing the sum thereof.

Figure 4:
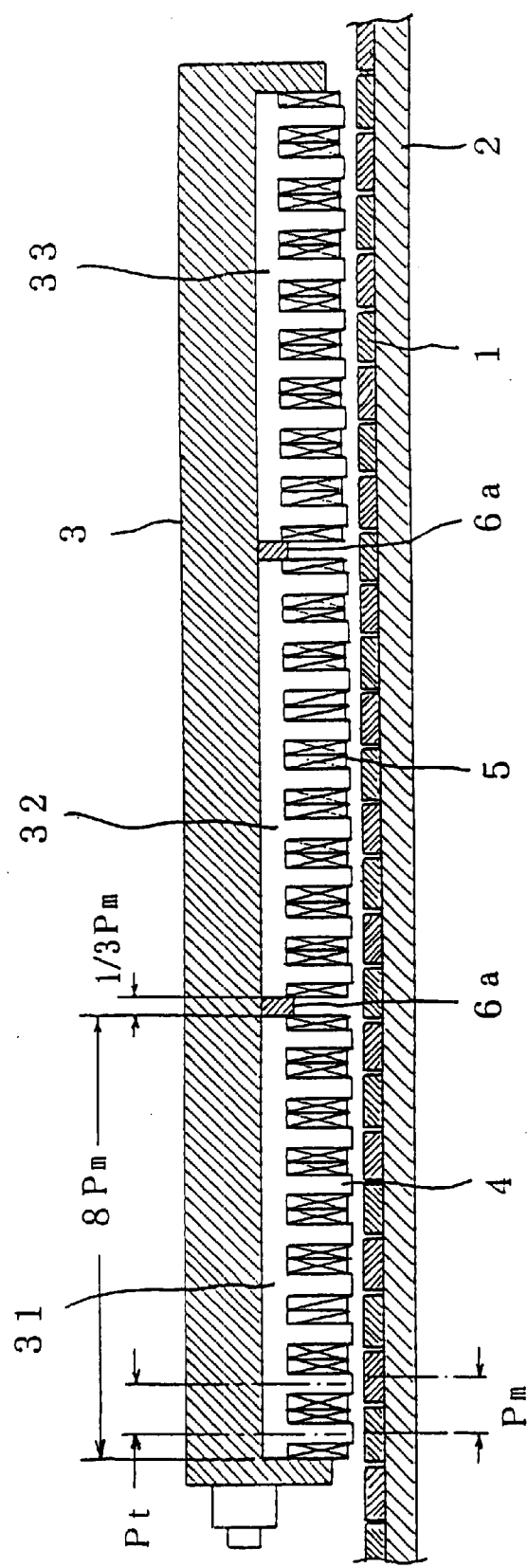
FIG. 4 is a side sectional view showing a second embodiment.

FIG. 4 is a side sectional view showing the second embodiment, wherein parts which are identical to those in the first embodiment are given the same reference numbers. The core of the rotor 3 is divided into three block cores, and they are linked to and coupled to each other with a spacer 6a having a width equivalent to one-third times the pitch Pm of the field magnet 1, and the respective block cores 31, 32 and 33 have a length equivalent to eight times the pitch Pm of the field magnet 1, each of which has nine teeth at equal pitches Pt, and the nine teeth are divided into three groups.

Thus, the teeth position of the same side edge of the respective block cores shifts by one-third of the magnet pitch Pm, placing a spacer 6a between the respective block cores, wherein since the magnet pitch Pm is 180° in terms of electrical angle, the shift becomes 60° in terms of electrical angle.

Figure 5:
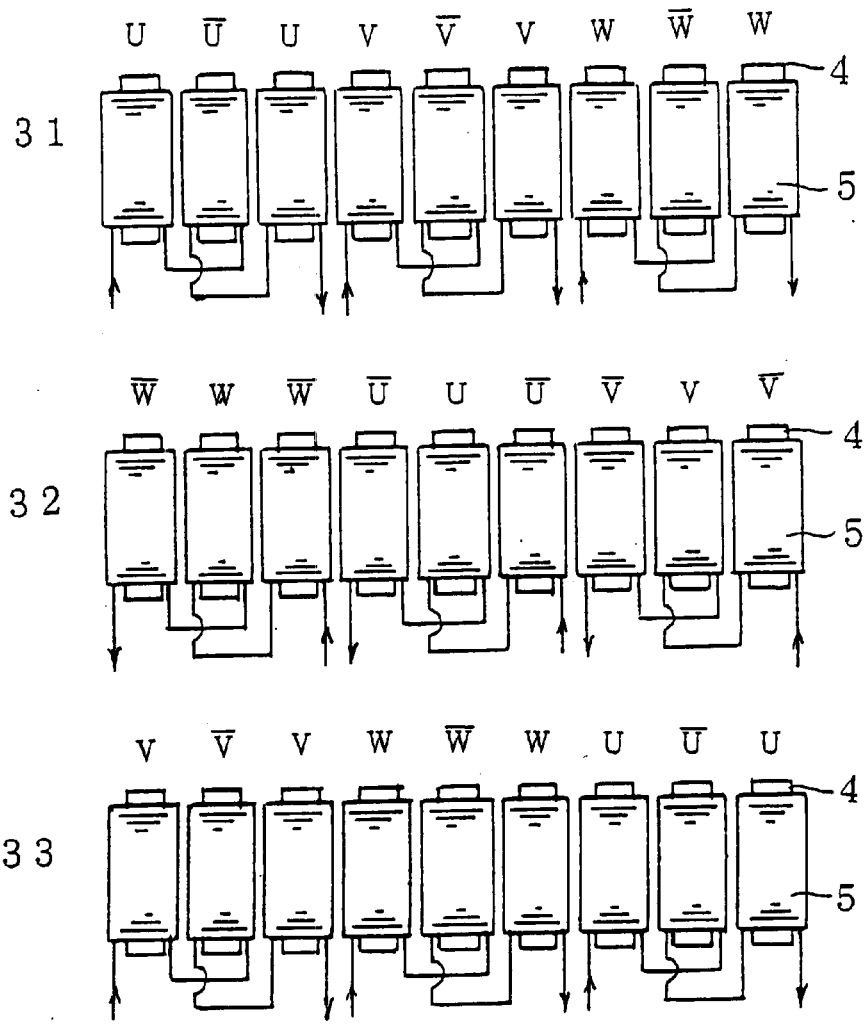
FIG. 5 is an explanatory view of winding in the second embodiment, wherein (a) is a connection diagram, and (b) is a winding layout diagram.
Figure 5:
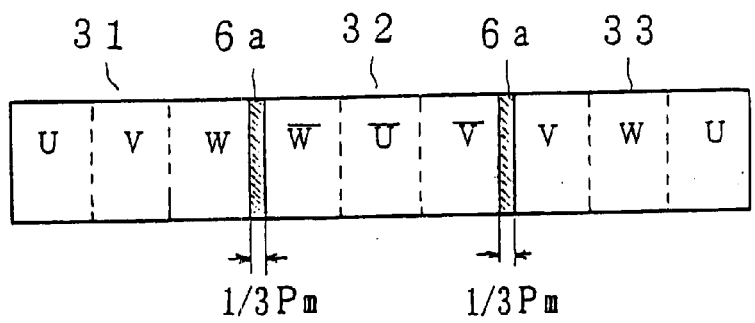

Therefore, as shown in the connection diagram in FIG. 5(a), in the first block core 31, coils of U phase, V phase and W phase are directly wound in slots of the respective groups in the order from the edge, as regards the armature coil of the second block core 32, coils are wound with the winding direction reversed, in the order of W phase, U phase and V phase because the phase is caused to shift by 60° in terms of electrical angle, and in the third block core 33, in order to secure a difference in phase of 60° from that of the second block core, the winding direction of the third block core is made the same as that of the first block core, and coils are wound in the order of V phase, W phase and U phase. The winding arrangement of the block cores in this state is illustrated in FIG. 5(b).

Figure 6:
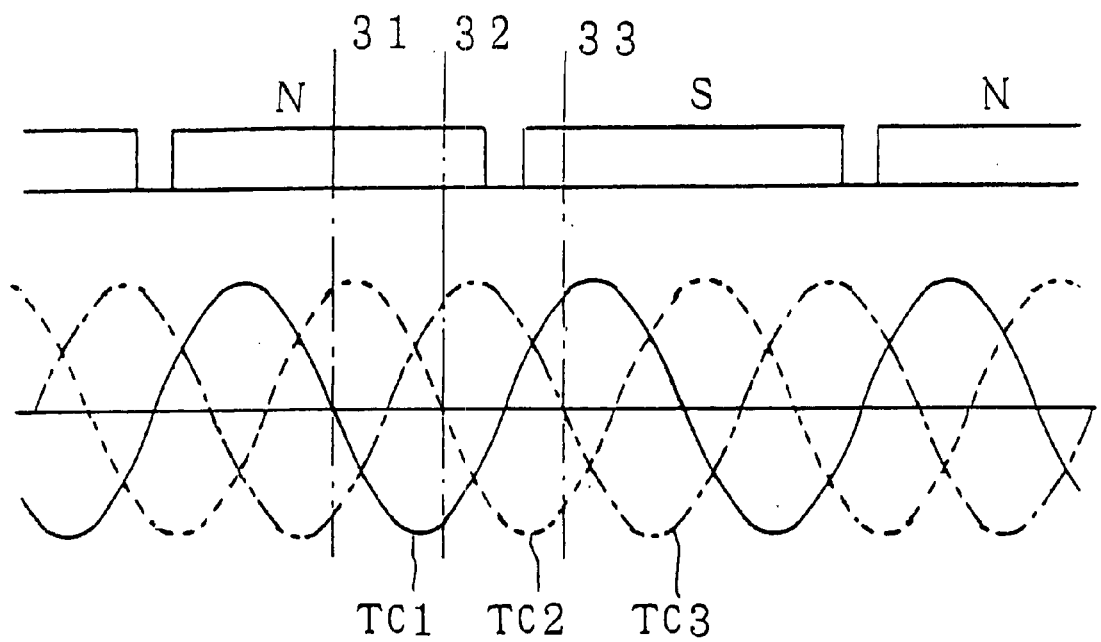
FIG. 6 is a characteristic view showing states of the cogging thrust in the second embodiment.

Accordingly, the cogging thrusts TC1, TC2, and TC3 arising by the edge effects of the respective block cores causes a difference in phase of 60° as shown in FIG. 6, thereby zeroing the sum thereof.

Figure 7:
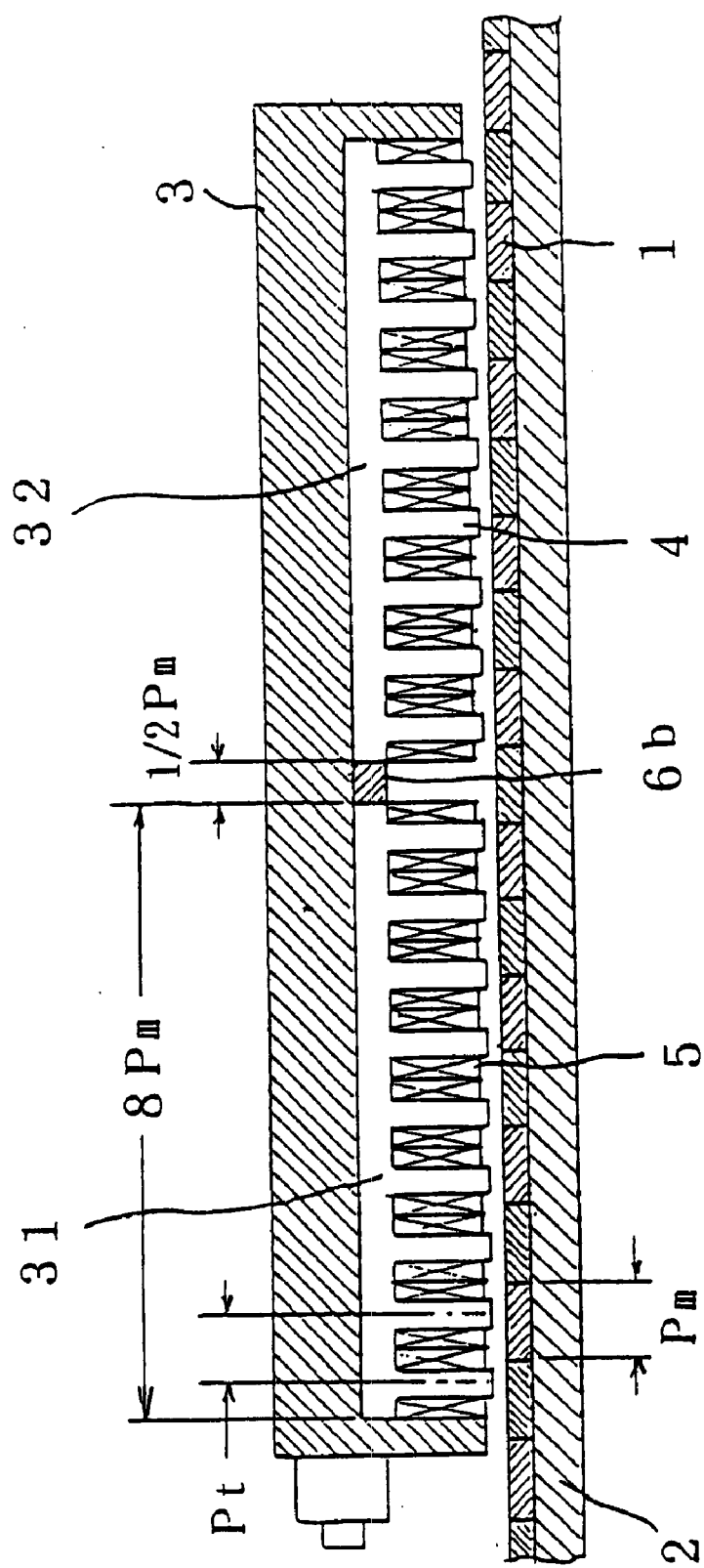
FIG. 7 is a side sectional view showing a third embodiment.

FIG. 7 is a side sectional view showing the third embodiment, wherein 1 is a field magnet, 2 is a fixing portion, and 3 is a rotor. In the embodiment, two block cores 31 and 32 provided with nine teeth with a length equivalent to eight magnet pitches Pm of the field magnet 1 at equal intervals are provided in a state where a spacer 6b having a width equivalent to one half of the magnet pitch Pm is placed therebetween.

As shown in FIG. 8(a), in the first block core 31, nine teeth 4 are divided into three groups to form U phase, V phase and W phase in the other by winding armature coils 5. In the second block core 32, one coil of V phase is wound on the first one tooth, a coil of W phase is wound on the second three teeth, a coil of U phase is wound on the third three teeth, and two coils of V phase are wound on the next two teeth, whereby armature coils 5 of the respective block cores are wound in the form of three-phase balanced winding with 90° as a difference in phase, and the flux linkage can be maximized.

Figure 9:
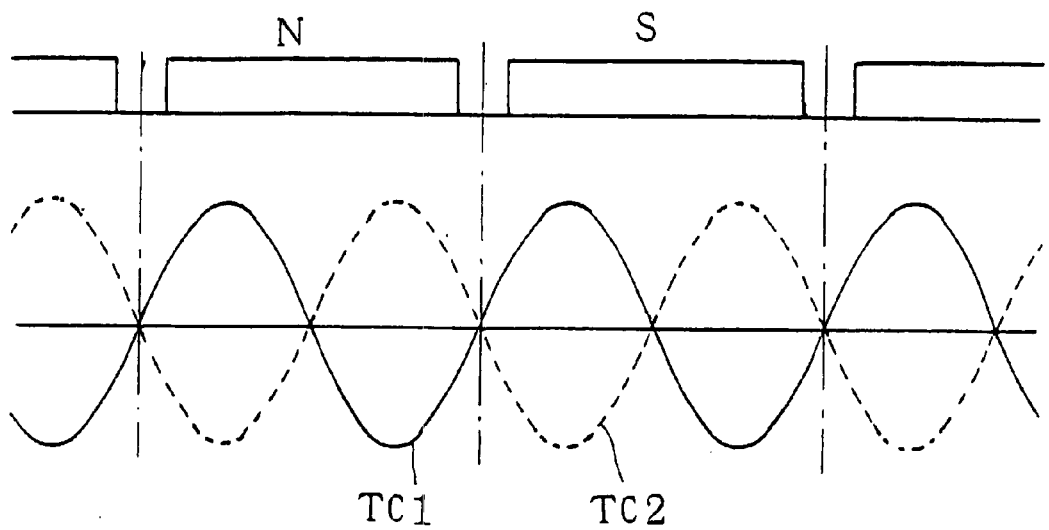
FIG. 9 is a characteristic view showing states of the cogging/thrust in the third embodiment.

Therefore, the winding layout of the respective block cores 32 and 33 becomes as in FIG. (b). As shown in FIG. 9, the cogging thrusts TC1 and TC2 arising due to the edge effects of the first block core 31 and second block cores 32 can be mutually counterbalanced.

Figure 10:
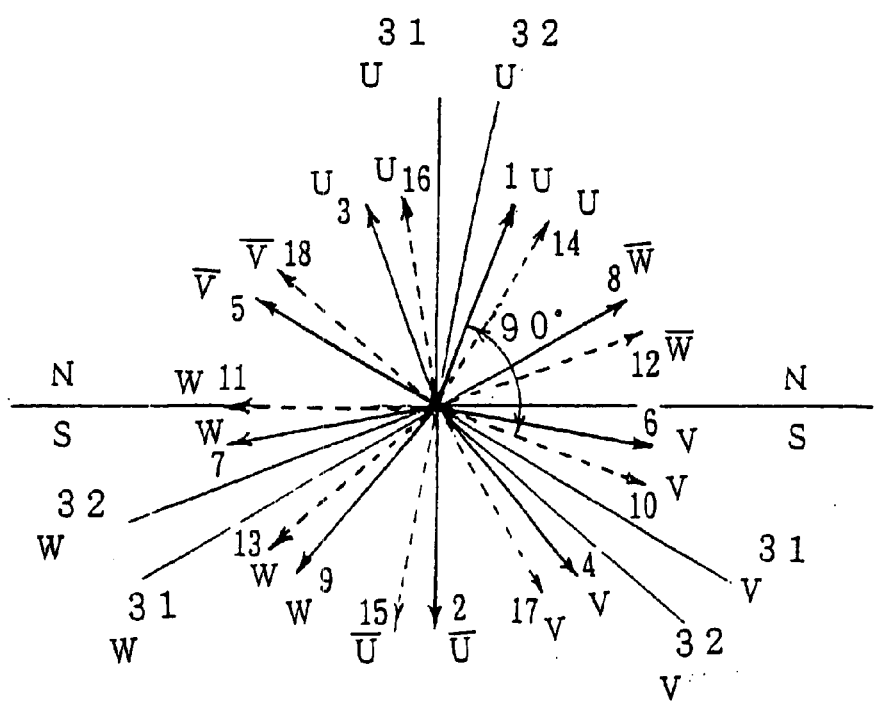
FIG. 10 is a vector diagram of respective phases in the third embodiment.

Also, by connecting the armature coil of the first block core to the armature coil of the second block core in the same phase in series, the phases of electromotive force vectors arising in the two armatures are synthesized as shown in FIG. 10, wherein the circulating current can be removed.

Figure 8:
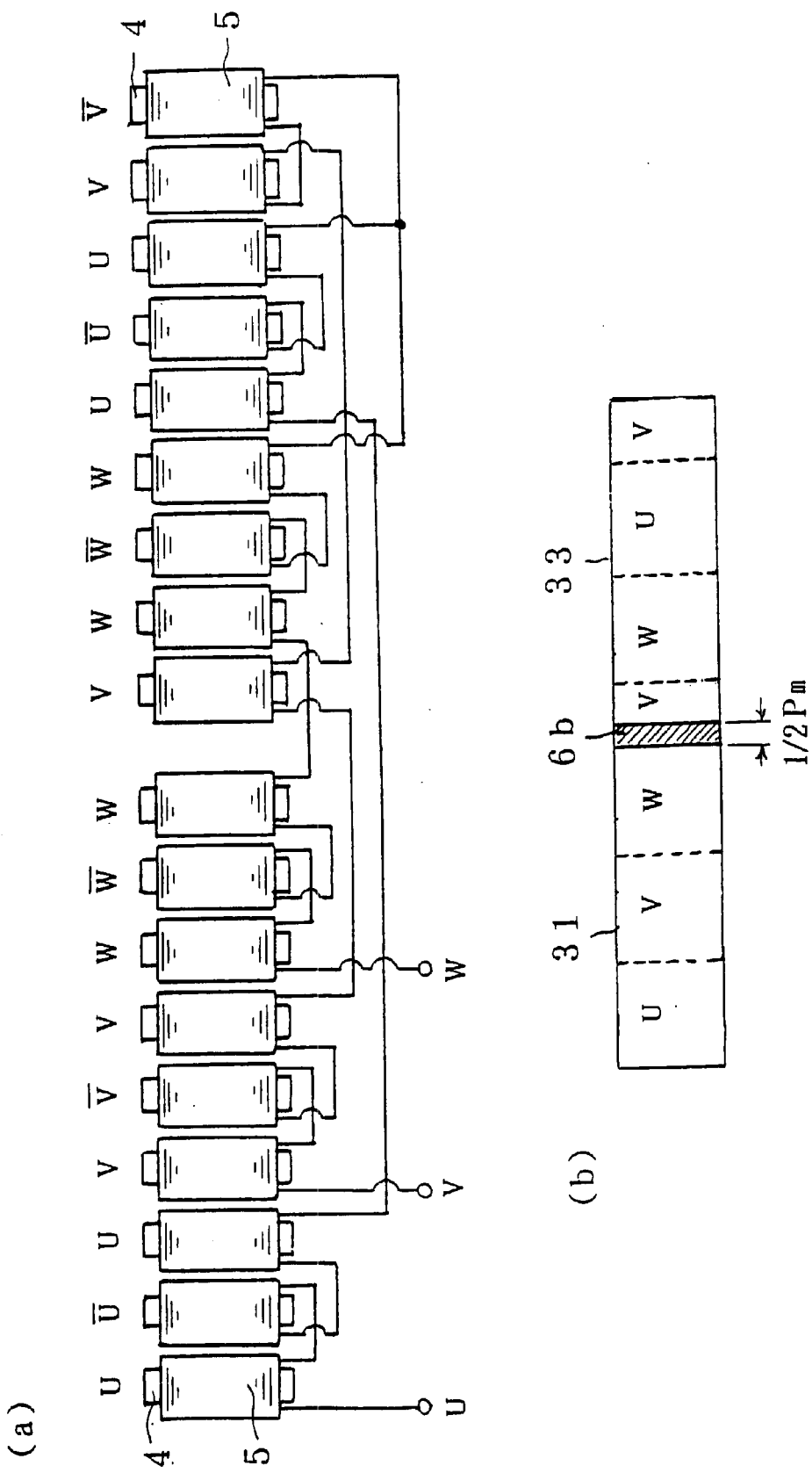
FIG. 8 is an explanatory view of winding in the third embodiment, wherein (a) is a connection diagram, and (b) is a winding layout diagram.
Figure 11:
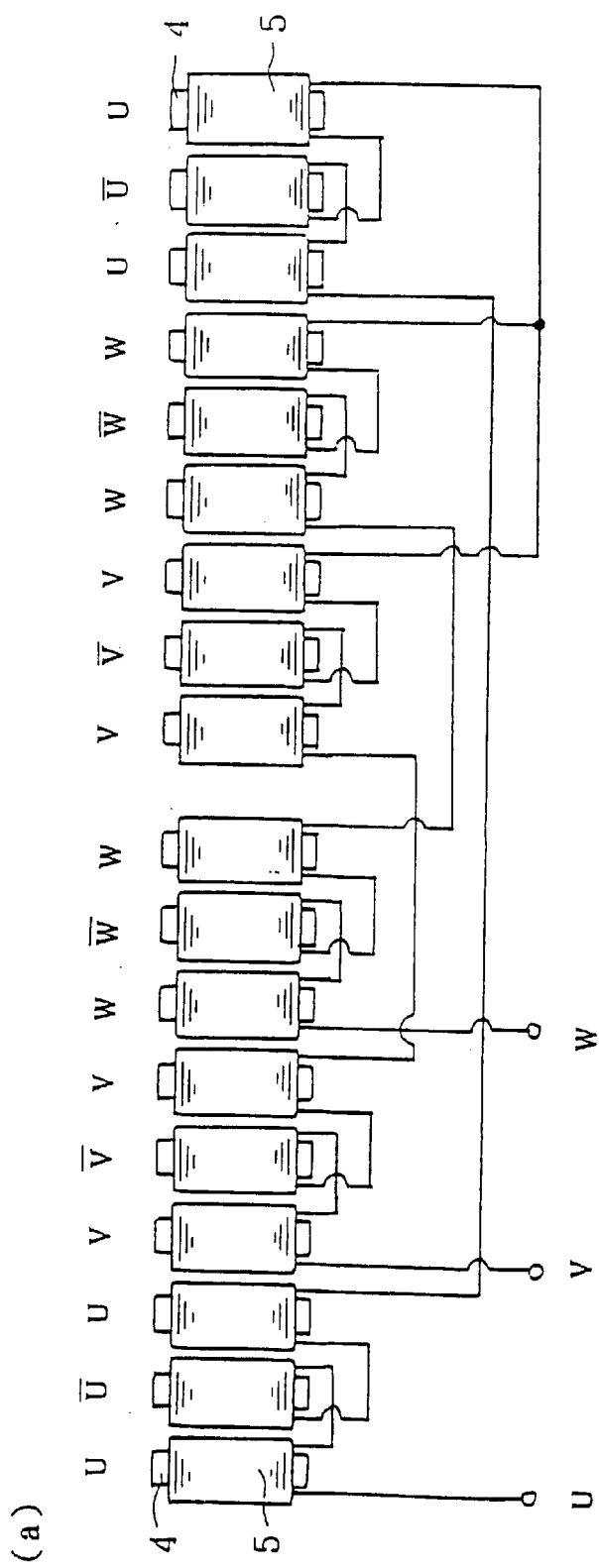
FIG. 11 is an explanatory view of winding, which shows a modified version of the fourth embodiment, wherein (a) is a connection diagram, and (b) is a winding layout diagram.
Figure 11:
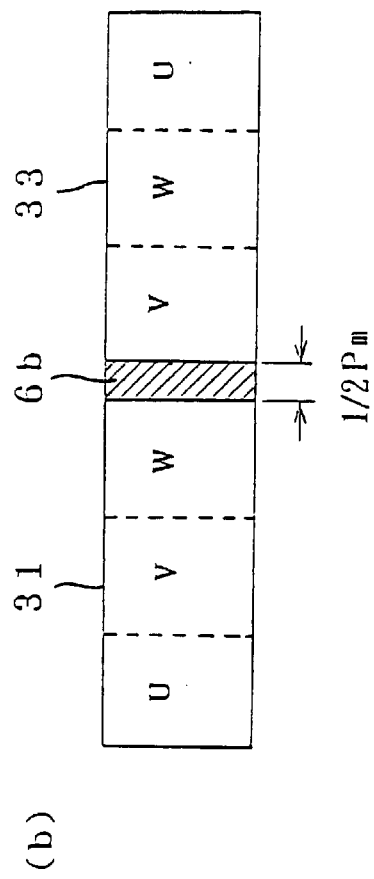

FIG. 11 is a winding layout diagram showing the fourth embodiment, which illustrates a modified version of the coil layout and coil connecting method shown in FIG. 8.

As shown in FIG. 11(a), in the first block core 31, nine teeth 4 are divided into three groups to form U phase, V phase and W phase in the order by winding armature coils 5. In the second block core 32, nine teeth are divided into three groups to form V phase, and W phase, U phase in that order by winding armature coils as well, whereby the armature coils 5 of the respective block cores can be wound in the form of three-phase balanced winding with 90° secured as a difference in phase.

Therefore, the winding layout of the respective block cores 31 and 32 becomes as shown in FIG. 11(b). The cogging thrusts TC1 and TC2 arising due to the edge effects the first block core 31 and second block core 32 can be counterbalanced as shown in FIG. 9. Also, by connecting the armature coil of the first block core 31 to the armature coil of the second block core in the same phase in series, the phases of electromotive force vectors arising in the two armatures are synthesized as shown in FIG. 10, whereby the circulating current can be removed.

Figure 12:
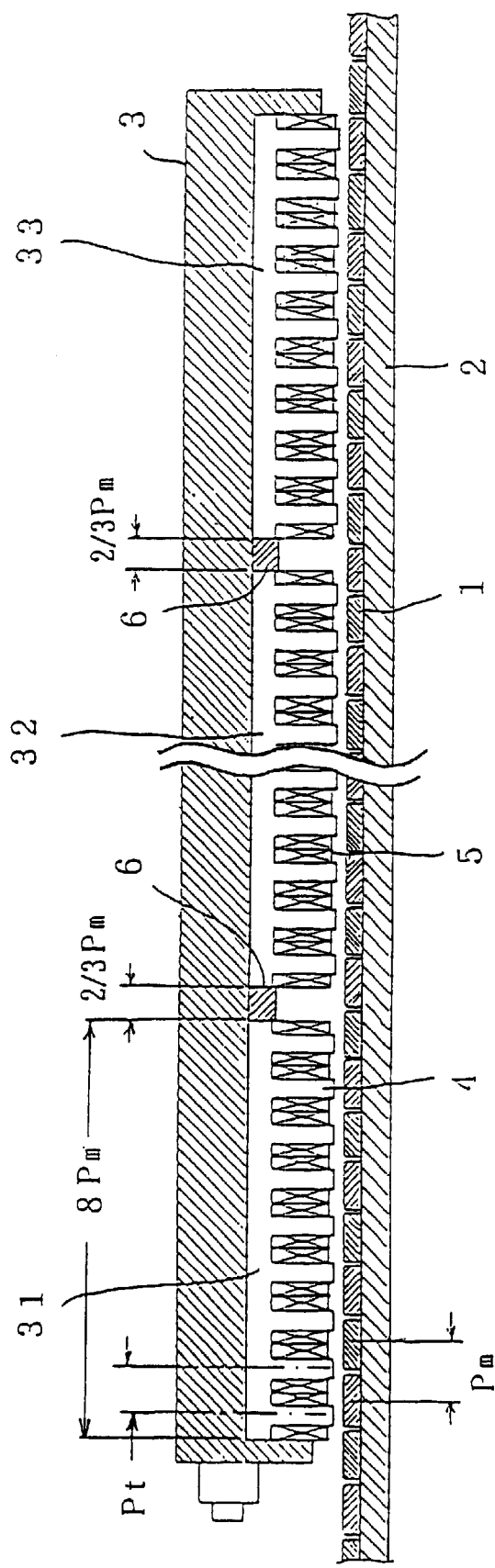
FIG. 12 is a side sectional viewshowing a fifth embodiment.

FIG. 12 shows the fifth embodiment of the invention, which is a preferable example where it is necessary to lengthen a linear motor.

In the same drawing, 1 is a field magnet attached to the fixing portion 2 at equal intervals. The field magnets 1 are disposed so as to cover a length which is obtained by adding the length of a rotor 3 moving opposed to the field magnets 1 to a stroke along which the rotor 3 moves. Cores secured in the rotor 3 are divided into the first block core 31, second block core 32 and block core 33 and disposed in the moving direction.

The respective block cores 31 and 33 have a length equivalent to eight times the pitch Pm of the field magnet 1 and are provided with nine teeth 4 at equal intervals. The teeth 4 are divided into three groups, and armature coils 5 of the respective phases are directly wound in the form of lumped winding in the respective groups. The block core 32 has a length equivalent to two times (sixteen times the pitch Pm) the block core 31 or 33 and are provided with eighteen teeth 4 at equal pitches Pt. The teeth 4 are, respectively, divided into three groups, wherein armature coils 5 of the respective phases are directly wound in the form of lumped winding in the respective groups.

6 is a spacer inserted between the respective block cores, and has a width equivalent to two-thirds of the pitch Pm of the field magnet 1. It is highly recommended that the spacer is made of a non-magnetic body.

The slot pitch in the winding layout of an electromagnetic structure in which the number of magnetic poles with respect to three-phase nine coils becomes eight becomes 160° in terms of electrical angle, and the coils skip as in No. 1 and No. 2. Therefore, coils can be directly wound on the teeth, and lumped winding can be secured. Therefore, as shown in the connection diagram in FIG. 13(a), the first block core 31 will have coils 5 in the order of U phase, V phase and W phase in the teeth of the respective groups.

The second block core 32 is caused to shift by spacers 6 by two-thirds of the field magnet pitch Pm in the thrust direction with respect to the first block core 31, wherein the magnet pitch Pm is 180° in terms of electrical angle. Therefore, the second block core 32 will shift by 120° in terms of electrical angle. Since the armature coil of the block core is caused to have 120° as a difference in phase with respect to the armature coil of the first block core 31, the armature coil 5 will form a V phase, W phase, and U phase in that order from the edge of the same side as that of the first block core twice repeatedly.

Figure 13:
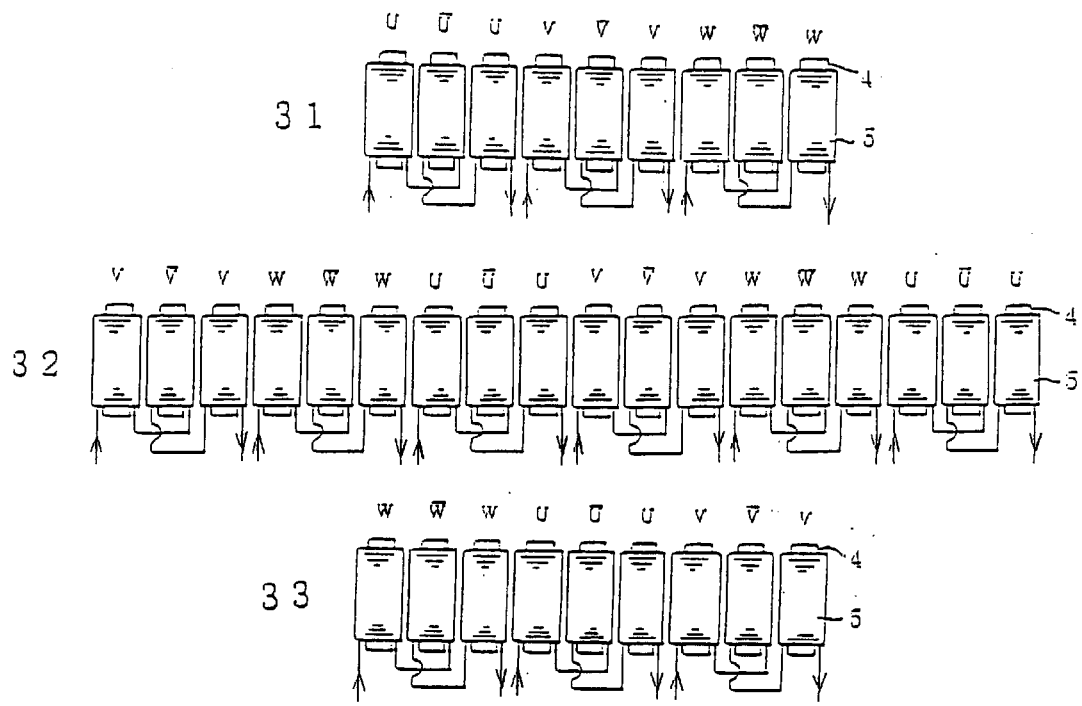
FIG. 13 is an explanatory view of winding in the fifth embodiment, wherein (a) is a connection diagram, and (b) is a winding layout diagram.
Figure 13:
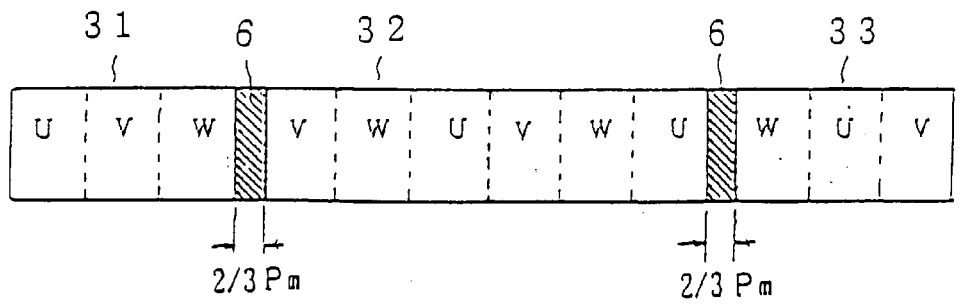

Also, the armature coil 5 of the third block core 33 is caused to shift by 120° in terms of electrical angle from the second block core 32 as well, and has W phase, U phase and V phase windings in that order. Therefore, the corresponding positions of the respective phase coils and magnets become the same as in the case where no phase shifts, and the flux linkage is maximized. Thus, with respect to the coil layout of the respective blocks of the rotor 3, as shown in FIG. 13(b), the block cores 31, 32 and 33 are spaced by spacers 6 equivalent to two thirds (120° in terms of electrical angle) of the pitch Pm of the field magnet 1, wherein, in line therewith, the armature coils of the respective block cores are wound with 120° secured as the difference in phase in terms of electrical angle, and the cogging thrusts TC1, TC2 and TC3 arising due to the edge effects of the respective block cores produce a difference of 120° in phase as shown in FIG. 3 as in the first embodiment, and the sum thereof can be zeroed.

Further, in the fifth embodiment, in a case where the advancing direction of the linear motor is reversed, the V phase and W phase are reversed in the second block core 32 and the third block core 33.

Figure 14:
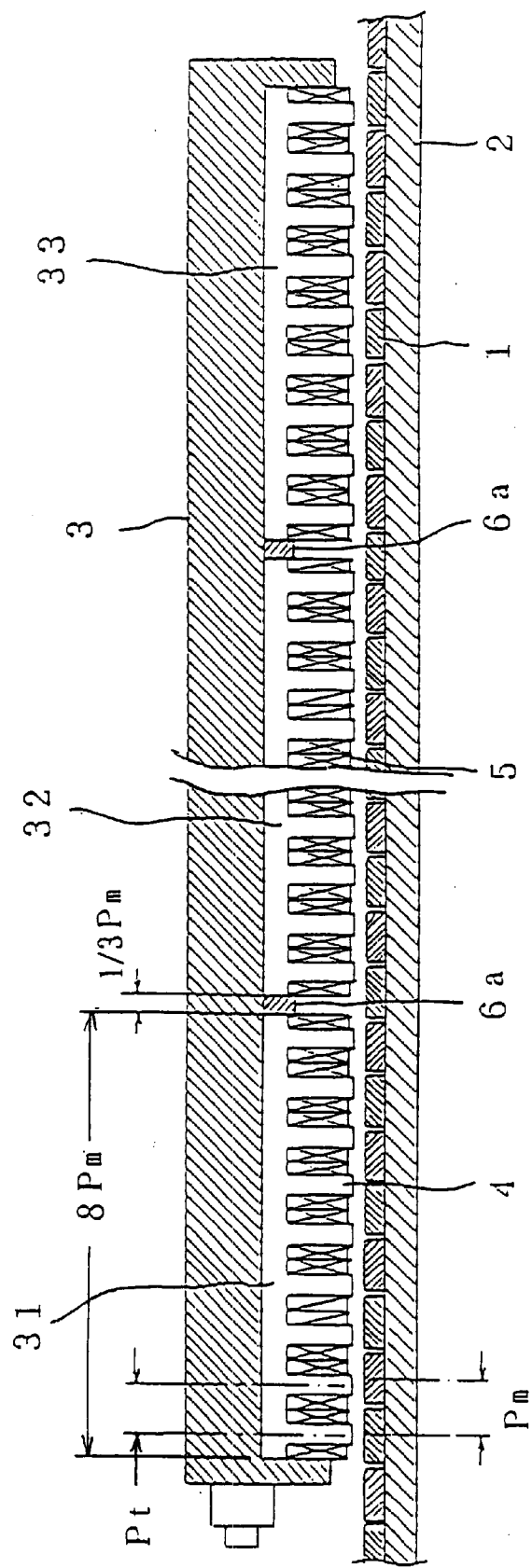
FIG. 14 is a side sectional view of a sixth embodiment.

FIG. 14 is a side sectional view showing the sixth embodiment, wherein the core of the rotor 3 is divided into three block cores which are linked with and connected to each other by placing spacers 6a having a width equivalent to one-third of the pitch Pm of the field magnet 1 therebetween, and the respective block cores 31 and 33 have a length equivalent to eight times the pitch Pm of the field magnet 1, and have nine teeth 4 at equal pitches Pt. The teeth 4 are grouped three by three. Also, the block core 32 has a length (a length equivalent to sixteen times the pitch Pm) equivalent to two times the length of the block cores 31 and 33 as in the fifth embodiment.

Thus, the teeth positions at the same side edge of the respective block cores shift by one-third of the magnet pitch Pm, placing spacers 6a between the block cores, wherein since the magnet pitch Pm is 180° in terms of electrical angle, the positions will shift by 60° in terms of electrical angle.

Figure 15:
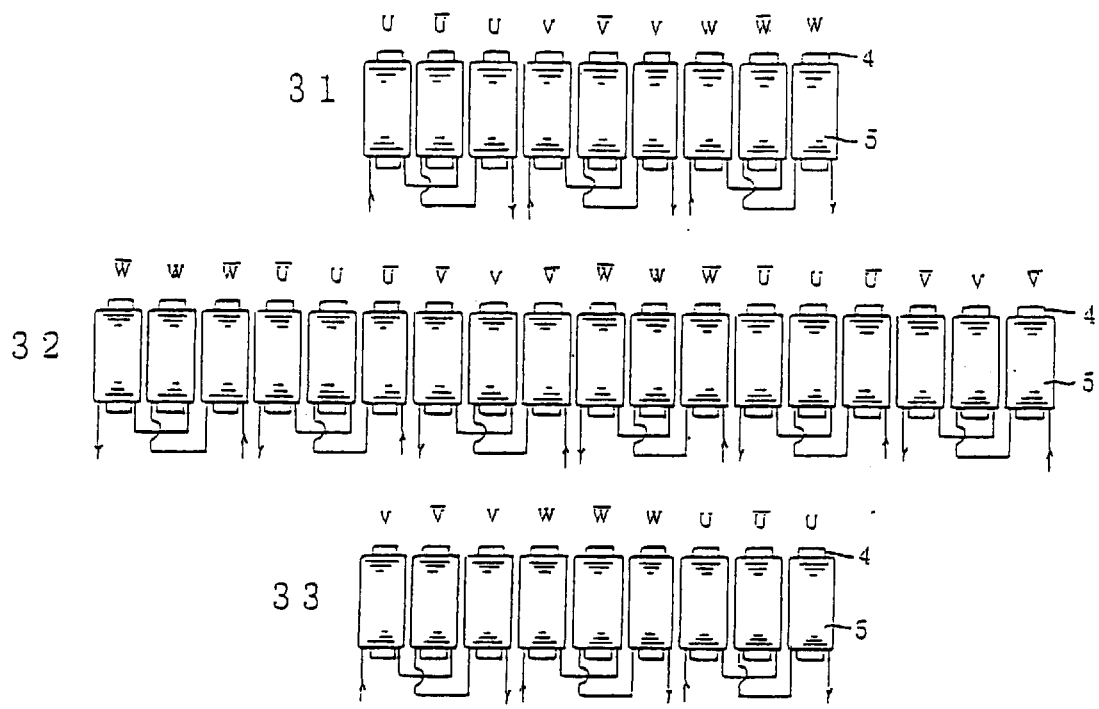
FIG. 15 is an explanatory view of winding in the sixth embodiment, wherein (a) is a connection diagram, and (b) is a winding layout diagram.
Figure 15:
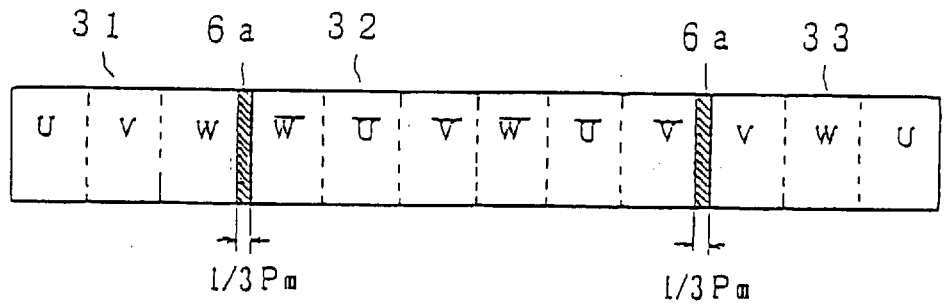

Therefore, as shown in the connection diagram of FIG. 15(a), in the first block core 31, U phase, V phase and W phase coils are directly wound in the slots of the respective group in that order from the edge, and since, in the armature coil of the second block core 32, the phase shifts by 60° in terms of electrical angle, it is wound repeatedly two times with the winding direction reversed in the order of W phase, U phase and V phase. The third block core is caused to have 60° as a difference in phase from the second block core 32. Therefore, the coil of the third block core is wound in the same direction as that of the first block core 31 in the order of V phase, W phase and U phase. The winding layout of the respective block cores in the state is shown in FIG. 15(b).

For this reason, the cogging thrusts TC1, TC2, and TC3 arising due to the edge effects of the respective block cores produce a difference of 60° in phase as shown in FIG. 6 as in the first embodiment, and the sum thereof is zeroed.

Also, in the embodiment, in a case where the advancing direction of the linear motor is reversed, the V phase and W phase are reversed in the second block core 32 and the third block core 33.

Figure 16:
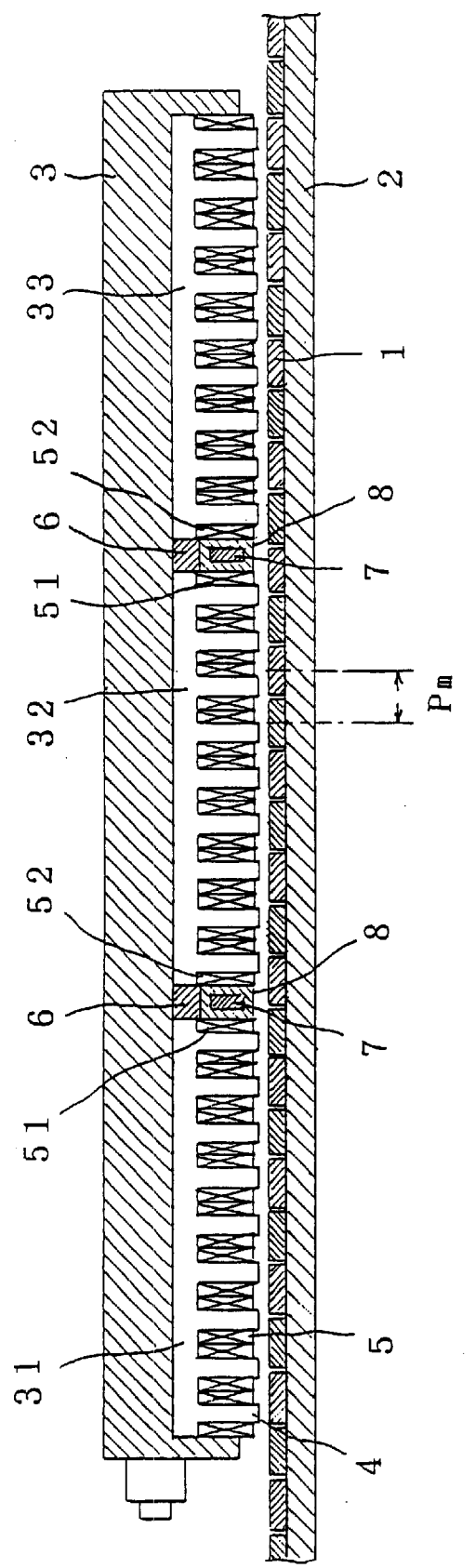
FIG. 16 is a side sectional view showing a seventh embodiment.
Figure 17:
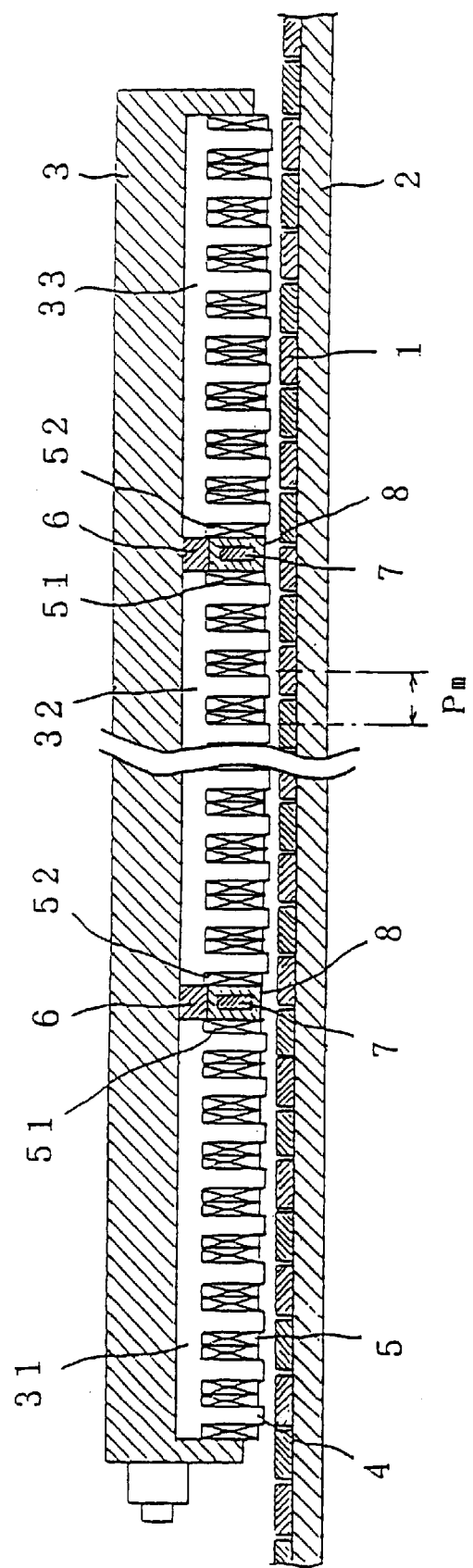
FIG. 17 is another side sectional view showing the seventh embodiment.

FIG. 16 and FIG. 17 are the seventh embodiment in which a temperature sensor is provided to control the temperature of the coils, wherein the core of the rotor 3 is divided into a plurality (three in the drawings) of block cores 31, 32 and 33, a space in which a spacer 6 is inserted is provided so as to have an interval equivalent to two-thirds of the pitch Pm of the field magnet 1 between the respective block cores, and a temperature sensor 7 such as a thermister or a thermal protector is inserted into the space between coils 51 and 52 at both sides. The temperature sensor is retained by filling the space with resin 8. Also, FIG. 16 corresponds to the first through the fourth embodiments, and FIG. 17 corresponds to the fifth and sixth embodiments.

Therefore, the temperature sensor 7 can detect the coil temperature not at the coil end but at the coil intermediate portion where the coil temperature rises. Accordingly, it is possible to securely detect the coil temperature without influencing the dimensions and configuration of the teeth 4 and armature coils 5.

Figure 18:
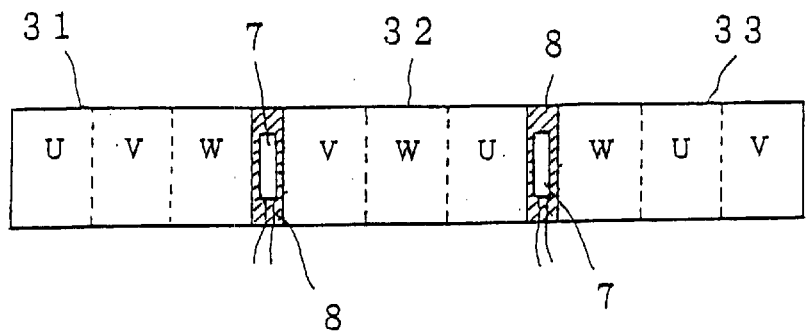
FIG. 18 is a winding layout diagram in the seventh embodiment.
Figure 19:
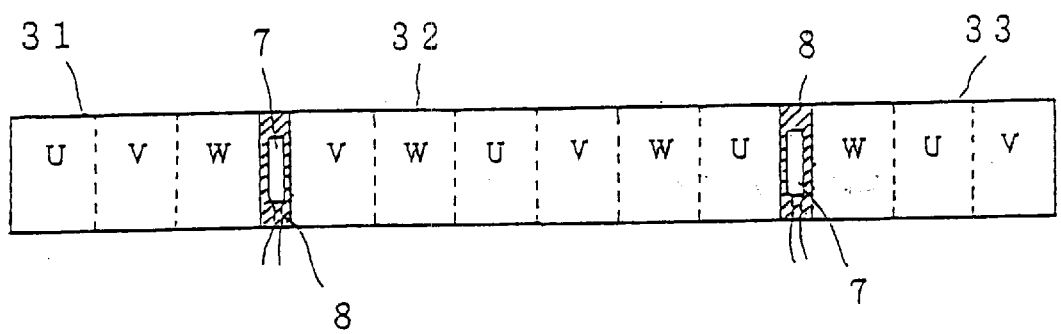
FIG. 19 is a winding layout diagram in the seventh embodiment.

Also, in the embodiment, as shown in the winding layout diagram of FIG. 18 and FIG. 19, since the temperature sensor is inserted between the W phase and the V phase and between the U phase and the W phase, it is possible to detect the coil temperatures of the respective phases while almost averaging them.

Further, although the temperature sensor is attached in the clearance with an adhesive agent, etc., it may be inserted between the coils and may be securely retained by filling with resin mold 8, and at the same time, the detection accuracy can be improved by making the thermal conductivity from the coils 51 and 52 better. Also, in this case, the entire iron core may be molded with resin.

Figure 20:
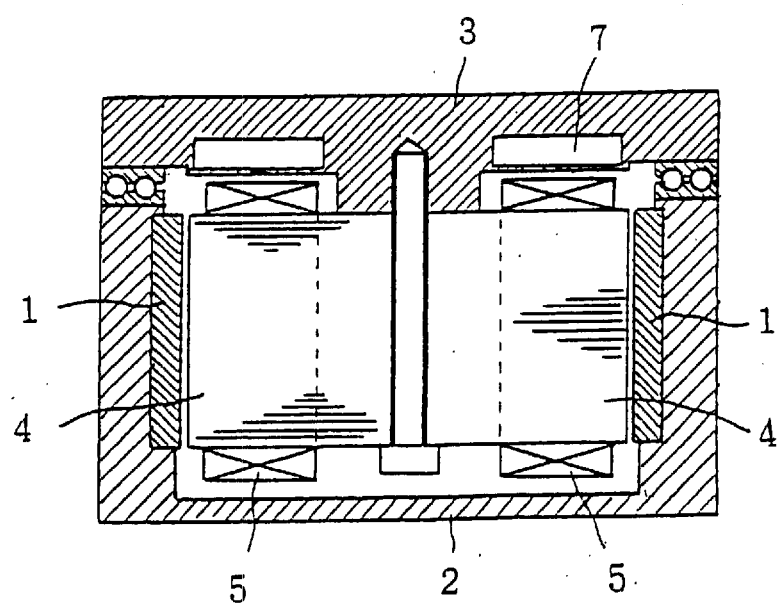
FIG. 20 is a front elevational view showing an eighth embodiment.

Further, in any one of the abovementioned embodiments, one side of the rotor 3 is provided with an armature coil 5 and the coil 5 is opposed to the field magnet 1. However, as shown in the sectional view in FIG. 20, teeth 4 provided with an armature coil 5 are secured at both sides of the rotor 3, and are opposed to field magnets 1 which are provided at both sides of the fixing portion 2. Also, in this case, the armature coils 5 may be embodied, wherein 7 is a refrigerant path for cooling.

Figure 21:
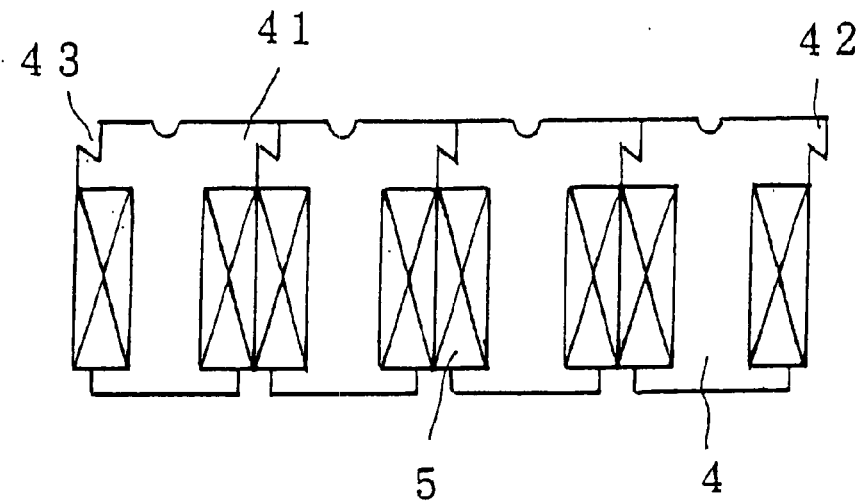
FIG. 21 is a partially side sectional view showing an ninth embodiment.
Figure 22:
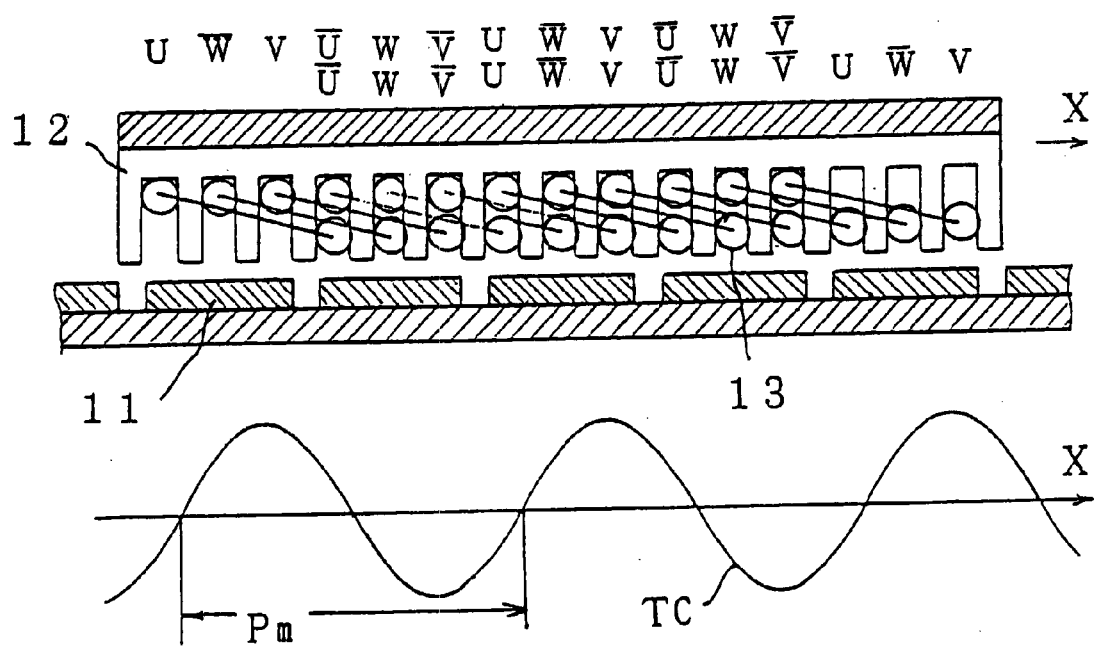
FIG. 22 is a side sectional view showing a prior art example, and is a characteristic view showing the state of the cogging thrust.

Also, in the respective embodiments described above, the block cores which are integrally made of a comb-shaped iron core are illustrated. However, as shown in FIG. 21, if lamination plates, in which an engagement projection 42 is formed at one side of the iron relay portion 41 while a fitting portion 43 to be engaged with the engagement projection is formed at the other side thereof, are fitted to and linked with each other, the shape of the teeth 4 can be made smaller to facilitate the punching-out work, and it is possible to connect components in which a coil 4 is wound in advance on the laminated teeth. Therefore, there is an advantage by which the winding can be facilitated.

Further, the embodiment may be applicable to block cores having teeth 4 at both sides as shown in the eighth embodiment.

The present invention applies to a moving coil linear motor which is used for table feeding in a machine tool, etc., and can be utilized in a field of manufacture and supply of linear motors in which the detection accuracy of coil temperature is improved.

What is claimed is:

1. A linear motor, comprising:
    field magnets spaced at equal intervals from one another and having an equal pitch; and
    a rotor arranged to move opposite to said field magnets and including an armature core divided into at least three block cores equally spaced apart from one another,
        each of said block cores including armature coils wound in the form of a concentrated winding and teeth, said armature coils of said block cores being wound around said teeth with their phases shifted by an electrical angle corresponding to the distance between said block cores.

2. A linear motor as set forth in claim 1, wherein said at least three block cores comprise a first block core, a second block core, and a third block core, each of said first, second and third block cores having nine teeth and a length equivalent to eight times the pitch of said field magnets, said teeth being arranged at equal pitches, the distance between said first, second and third block cores being equivalent to two-thirds of the pitch of said field magnets, said teeth of said first, second and third block cores being grouped three by three, said armature coils of said first block core being wound in the order of U phase, V phase and W phase in respective groups thereof, said armature coils of said second block core being wound in the order of V phase, W phase and U phase in respective groups thereof, said armature coils of said third block core being wound in the order of W phase, U phase and V phase in respective groups thereof, said armature coils being wound in the form of a balanced three-phase winding with a difference of 120° in phase.

3. A linear motor as set forth in claim 1, wherein said at least three block cores comprise a first block core, a second block core, and a third block core, each of said first, second and third block cores having nine teeth and a length equivalent to eight times the pitch of said field magnets, said teeth being arranged at equal pitches, the distance between said first, second and third block cores being equivalent to one-third of the pitch of said field magnets, said teeth of said first, second and third block cores being grouped three by three, said armature coils of said first block core being wound in the order of U phase, V phase and W phase in respective groups thereof, said armature coils of said second block core being wound in the order of W phase, U phase and V phase in respective groups thereof with the winding direction reversed from the winding direction of said armature coils of said first block core, said armature coils of said third block core being wound in the order of V phase, W phase and U phase in respective groups thereof in the same winding direction as that of said first block core, said armature coils being wound in the form of a balanced three-phase winding with a difference of 60° in phase.

4. A linear motor as set forth in claim 1, wherein said at least three block cores comprise a first block core having nine teeth and a length equivalent to eight times the pitch of said field magnets, said teeth of said first block core being arranged at equal pitches, a second block core having eighteen teeth and a length equivalent to sixteen times the pitch of said field magnets, said teeth of said second block core being arranged at equal pitches, and a third block core similar to said first block core, said first, second and third block cores being spaced apart from one another by a distance equivalent to two-thirds of the pitch of said field magnets, said teeth in said first, second and third block cores being grouped three by three, said armature coils of said first block core being wound in the order of U phase, V phase and W phase in respective groups thereof, said armature coils of said second block core being wound repeatedly two times in the order of V phase, W phase and U phase in respective groups thereof, said armature coils of said third block core being wound in the order of W phase, U phase and V phase in respective groups thereof, said armature coils being connected in a balanced three-phase winding with a difference of 120° in phase.

5. A linear motor as set forth in claim 1, wherein said at least three block cores comprise a first block core having nine teeth and a length equivalent to eight times the pitch of said field magnets, said teeth of said first block core being arranged at equal pitches, a second block core having eighteen teeth and a length equivalent to sixteen times the pitch of said field magnets, said teeth of said second block core being arranged at equal pitches, and a third block core similar to said first block core, said first, second and third block cores being spaced apart from one another by a distance equivalent to two-thirds of the pitch of said field magnets, said teeth in said first, second and third block cores being grouped three by three, said armature coils of said first block core being wound in the order of U phase, V phase and W phase in respective groups thereof, said armature coils of said second block core being wound repeatedly two times in the order of W phase, V phase and U phase in respective groups thereof, said armature coils of said third block core being wound in the order of V phase, U phase and W phase in respective groups thereof, said armature coils being connected in a balanced three-phase winding with a difference of 120° in phase.

6. A linear motor as set forth in claim 1, wherein said at least three block cores comprise a first block core, a second block core and a third block core being spaced apart from one another by a distance equivalent to one-third of the pitch of said field magnets, said teeth of said first, second and third block cores being grouped three by three, said armature coils of said first block core being wound in the order of U phase, V phase and W phase in respective groups, said armature coils of said second block core being wound in the order of W phase, U phase and V phase repeatedly two times in respective groups with the winding direction reversed, said armature coils of said third block core being wound in the order of V phase, W phase and U phase in the same winding direction as that of the first block core, said armature coils being connected in a balanced three-phase winding with a difference of 60° in phase.

7. A linear motor as set forth in claim 1, wherein said at least three block cores comprise a first block core, a second block core and a third block core being spaced apart from one another by a distance equivalent to one-third of the pitch of said field magnets, said teeth of said first, second and third block cores being grouped three by three, said armature coils of said first block core being wound in the order of U phase, V phase and W phase in respective groups, said armature coils of said second block core being wound in the order of V phase, U phase and W phase repeatedly two times in respective groups with the winding direction reversed, said armature coils of said third block core being wound in the order of W phase, V phase and U phase in the same winding direction as that of said first block core, said armature coils being connected in a balanced three-phase winding with a difference of 60° in phase.

8. A linear motor as set forth in claim 1, further comprising a spacer made of a non-magnetic substance arranged between adjacent ones of said at least three block cores.

9. A linear motor as set forth in claim 1, further comprising a fixing portion, said field magnets being attached to said fixing portion.

10. A linear motor as set forth in claim 1, wherein the distance between said at least three block cores is determined by dividing the electrical angle of the pitch of said field magnets by the number of block cores and multiplying the result by an integer less than the number of block cores.

11. A linear motor as set forth in claim 10, wherein said at least three block cores consists of three block cores and the electrical angle of the pitch of said field magnets is 180 degrees such that the distance between said three block cores is 60 degrees which translates into ⅓ of the pitch of said field magnets or 120 degrees which translates into ⅔ of the pitch of said field magnets.

12. A linear motor as set forth in claim 1, wherein said at least three block cores are equal in length.

13. A linear motor as set forth in claim 1, wherein a thrust direction is defined as a direction of movement of said rotor relative to said field magnets, said at least three block cores being arranged linearly in the thrust direction.

14. A linear motor as set forth in claim 1, wherein said at least three block cores comprise a first block core having nine teeth and a length equivalent to eight times the pitch of said field magnets, said teeth of said first block core being arranged at equal pitches, a second block core having eighteen teeth and a length equivalent to sixteen times the pitch of said field magnets, said teeth of said second block core being arranged at equal pitches, and a third block core similar to said first block core, the distance between said first, second and third block cores being equivalent to two-thirds of the pitch of said field magnets, said teeth in said first, second and third block cores being grouped three by three, said armature coils of said first block core being wound in the order of U phase, V phase and W phase in respective groups thereof, said armature coils of said second block core being wound repeatedly two times in the order of V phase, W phase and U phase in respective groups thereof, said armature coils of said third block core being wound in the order of W phase, U phase and V phase in respective groups thereof.

15. A linear motor as set forth in any one of claims 1–3 and 4–7, further comprising a temperature sensor arranged between adjacent ones of said at least three block cores to detect the temperature of an intermediate portion of said armature coils alongside said temperature sensor.

16. A linear motor as set forth in claim 15, wherein said temperature sensor is arranged in a resin-molded armature.

17. A linear motor comprising:
field magnets spaced at equal intervals from one another and having an equal pitch; and
a rotor arranged to move opposite to said field magnets and including an armature core divided into first and second block cores,
each of said block cores including armature coils wound in the form of a concentrated winding and having nine teeth arranged at equal pitch, said armature coils of said block cores being wound with their phases shifted by an electrical angle corresponding to a distance between said block cores, said block cores having a length equivalent to eight times the pitch of said field magnets, the distance between said block cores being equivalent to one half of the pitch of said field magnets, said armature coils of said first block core being wound in the order of U phase, V phase and W phase with said teeth being grouped three by three, said armature coils of said second block core being arranged such that said second block core has one coil of V phase wound around a first tooth, a coil of W phase wound around the next three teeth, a coil of U phase wound around the next three teeth, and a coil of V phase wound around the remaining two teeth, said armature coils being wound in the form of a balanced three-phase winding with a difference of 90° in phase.

18. A linear motor, comprising:
field magnets spaced at equal intervals from one another and having an equal pitch; and
a rotor arranged to move opposite to said field magnets and including an armature core divided into first and second block cores,
each of said first and second block cores including armature coils wound in the form of a concentrated winding and having nine teeth arranged at equal pitch, said armature coils of said first and second block cores being wound with their phases shifted by an electrical angle corresponding to a distance between said block cores, said block cores having a length equivalent to eight times the pitch of said field magnets, the distance between said block cores being equivalent to one half of the pitch of said field magnets, said armature coils of said first block core being wound in the order of U phase, V phase and W phase with said teeth grouped three by three, said armature coils of said second block core being wound in the order of V phase, W phase and U phase with said teeth grouped three by three, said armature coils being wound in the form of a balanced three-phase winding with a difference of 90° in phase.

19. A linear motor as set forth in claim 17 or 18, wherein the same phase coils of said first block core and said second block core are connected in series.

20. A linear motor as set forth in claim 17 or 18, further comprising a spacer made of a non-magnetic material arranged between said first and second block cores.

21. A linear motor as set forth in claim 17 or 18, further comprising a temperature sensor arranged between said first and second block cores to detect the temperature of an intermediate portion of said armature coils alongside said temperature sensor.

22. A linear motor as set forth in claim 21, wherein said temperature sensor is arranged in a resin-molded armature.

23. A linear motor as set forth in any one of claims 1–5 and 4–7, wherein said teeth of said block cores each have an iron relay portion for coupling said teeth together, said iron relay portion including an engagement projection formed at one side of said tooth and a fitting portion formed at the other side of said tooth to be engaged with said engagement projection, said teeth being coupled together by engaging said engagement portion of one of said teeth with said fitting portion of another of said teeth.

24. A linear motor, comprising:
field magnets spaced at equal intervals from one another and having an equal pitch; and
a rotor arranged to move in a thrust direction opposite to said field magnets, said rotor including an armature core divided into at least three block cores equally spaced apart from one another,
each of said block cores including teeth and armature coils wound in the form of a concentrated winding around said teeth with the phases of said armature coils being shifted by an electrical angle corresponding to the distance between said block cores.

25. A linear motor as set forth in claim 24, wherein said at least three block cores comprise a first block core, a second block core, and a third block core, each of said first, second and third block cores having nine teeth and a length equivalent to eight times the pitch of said field magnets, said teeth being arranged at equal pitches and being grouped by threes, the distance between said first, second and third block cores being equivalent to two-thirds of the pitch of said field magnets, said armature coils of said first block core being wound in the order of U phase, V phase and W phase in respective groups thereof, said armature coils of said second block core being wound in the order of V phase, W phase and U phase in respective groups thereof, said armature coils of said third block core being wound in the order of W phase, U phase and V phase in respective groups thereof.

26. A linear motor as set forth in claim 24, wherein said at least three block cores comprise a first block core, a second block core, and a third block core, each of said first, second and third block cores having nine teeth and a length equivalent to eight times the pitch of said field magnets, said teeth being arranged at equal pitches and being grouped by threes, the distance between said first, second and third block cores being equivalent to one-third of the pitch of said field magnets, said armature coils of said first block core being wound in the order of U phase, V phase and W phase in respective groups thereof, said armature coils of said second block core being wound in the order of W phase, U phase and V phase in respective groups thereof with the winding direction reversed from the winding direction of said armature coils of said first block core, said armature coils of said third block core being wound in the order of V phase, W phase and U phase in respective groups thereof in the same winding direction as that of said first block core.

27. A linear motor as set forth in claim 24, wherein said at least three block cores comprise a first block core having nine teeth and a length equivalent to eight times the pitch of said field magnets, said teeth of said first block core being arranged at equal pitches, a second block core having eighteen teeth and a length equivalent to sixteen times the pitch of said field magnets, said teeth of said second block core being arranged at equal pitches, and a third block core similar to said first block core, the distance between said first, second and third block cores being equivalent to two-thirds of the pitch of said field magnets, said teeth in said first, second and third block cores being grouped three by three, said armature coils of said first block core being wound in the order of U phase, V phase and W phase in respective groups thereof, said armature coils of said second block core being wound repeatedly two times in the order of W phase, V phase and U phase in respective groups thereof, said armature coils of said third block core being wound in the order of V phase, U phase and W phase in respective groups thereof.

28. A linear motor as set forth in claim 24, wherein said at least three block cores comprise a first block core, a second block core and a third block core spaced apart from one another by a distance equivalent to one-third of the pitch of said field magnets, said teeth of said first, second and third block cores being grouped by threes, said armature coils of said first block core being wound in the order of U phase, V phase and W phase in respective groups, said armature coils of said second block core being wound in the order of W phase, U phase and V phase repeatedly two times in respective groups with the winding direction reversed, said armature coils of said third block core being wound in the order of V phase, W phase and U phase in the same winding direction as that of the first block core.

29. A linear motor as set forth in claim 24, wherein said at least three block cores comprise a first block core, a second block core and a third block core spaced apart from one another by a distance equivalent to one-third of the pitch of said field magnets, said teeth of said first, second and third block cores being grouped by threes, said armature coils of said first block core being wound in the order of U phase, V phase and W phase in respective groups, said armature coils of said second block core being wound in the order of V phase, U phase and W phase repeatedly two times in respective groups with the winding direction reversed, said armature coils of said third block core being wound in the order of W phase, V phase and U phase in the same winding direction as that of said first block core.

30. A linear motor as set forth in claim 24, further comprising a spacer made of a non-magnetic substance arranged between adjacent ones of said at least three block cores.

31. A linear motor as set forth in claim 24, further comprising a temperature sensor arranged between adjacent ones of said at least three block cores to detect the temperature of an intermediate portion of said armature coils alongside said temperature sensor.

32. A linear motor as set forth in claim 24, wherein said temperature sensor is arranged in a resin-molded armature.

33. A linear motor as set forth in claim 24, wherein said teeth of said block cores each have an iron relay portion for coupling said teeth together, said iron relay portion including an engagement projection formed at one side of said tooth and a fitting portion formed at the other side of said tooth to be engaged with said engagement projection, said teeth being coupled together by engaging said engagement portion of one of said teeth with said fitting portion of another of said teeth.

34. A linear motor as set forth in claim 24, further comprising a fixing portion, said field magnets being attached to said fixing portion.

35. A linear motor as set forth in claim 24, wherein the distance between said at least three block cores is determined by dividing the electrical angle of the pitch of said field magnets by the number of block cores and multiplying the result by an integer less than the number of block cores.

36. A linear motor as set forth in claim 35, wherein said at least three block cores consists of three block cores and the electrical angle of the pitch of said field magnets is 180 degrees such that the distance between said three block cores is 60 degrees which translates into 1/3 of the pitch of said field magnets or 120 degrees which translates into 2/3 of the pitch of said field magnets.

37. A linear motor as set forth in claim 24, wherein a thrust direction is defined as a direction of movement of said rotor relative to said field magnets, said at least three block cores being arranged linearly in the thrust direction.

38. A method for constructing a linear motor, comprising the steps of:
   spacing field magnets at equal intervals from one another with the field magnets having an equal pitch;
   arranging a rotor having an armature core opposite the field magnets;
   dividing the armature core into at least three block cores, each block core including teeth and armature coils wound in the form of a concentrated winding around the teeth;
   determining a distance between the block cores by dividing the electrical angle of the pitch of the field magnets by the number of block cores and multiplying the result by an integer less than the number of block cores; and
   spacing the block cores equidistant from one another by the determined distance.

* * * * *